(No Model.)
T. A. EDISON.
MANUFACTURE OF CARBON FILAMENTS.
No. 534,207. Patented Feb. 12, 1895.
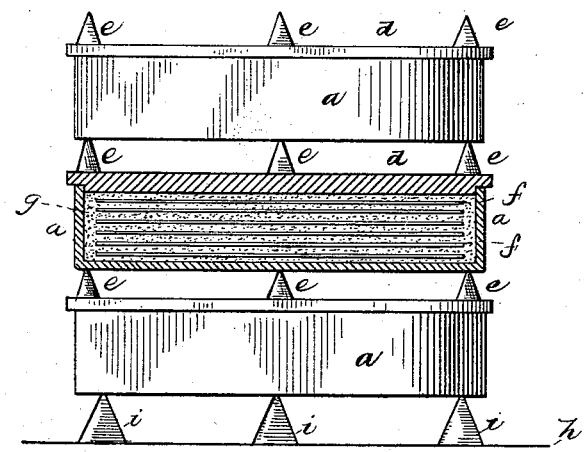
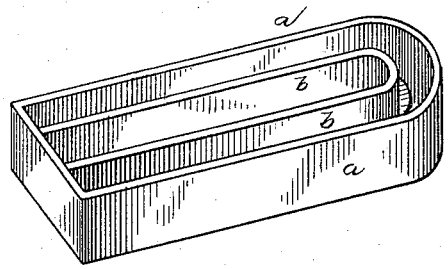
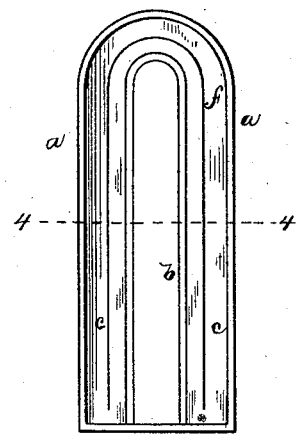
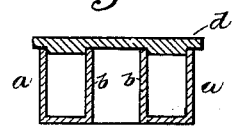
ATTEST
INVENTOR:

UNITED STATES PATENT OFFICE.

THOMAS A. EDISON, OF LLEWELLYN PARK, NEW JERSEY.

MANUFACTURE OF CARBON FILAMENTS.

SPECIFICATION forming part of Letters Patent No. 534,207, dated February 12, 1895.

Application filed December 27, 1886. Serial No. 222,734. (No model.)

*To all whom it may concern:*

Be it known that I, THOMAS A. EDISON, of Llewellyn Park, in the county of Essex and State of New Jersey, have invented a certain new and useful Improvement in the Manufacture of Carbon Filaments, (Case No. 713,) of which the following is a specification.

The object of my invention is to produce carbon filaments for the incandescent conductors of electric lamps, which shall have an even degree of carbonization, and shall not be liable to distortion when they are heated electrically.

I have devised a form of carbonizing mold which is so constructed that the filaments placed within it, receive heat equally on all sides and at all parts, and I so place several of these molds in the carbonizing chamber that they will all be heated alike, whereby even carbonization is insured.

My invention is illustrated in the accompanying drawings, in which—

Figure 1, is a perspective view of a mold embodying my invention with its cover removed; Fig. 2, a top view of the same; Fig. 3, an illustration of the manner of arranging the molds in use, one of said molds being shown in section on the line 3—3 of Fig. 2 and the others in elevation; and Fig. 4, a section on the line 4—4 of Fig. 2.

The mold or receptacle for the filaments consists of an oblong box, consisting of outer walls $a$, inner walls $b$, and a bottom $c$, between the outer and inner walls, and these parts being rounded at one end to conform to the preferable shape of the filaments, so that a space or channel is formed between the outer and inner walls within which such filaments may be conveniently placed. The box is provided with a tightly fitting cover $d$, and the cover has upward projections $e\ e$, or such projections may extend down from the bottom of the box. The filaments $f$ of carbonizable material having been formed in the desired shape, a suitable number of them are placed in the box with powdered anthracite coal $g$ or other infusible heat conducting material packed around and between them. The covers being placed on the boxes, a suitable number of such boxes are placed in the carbonizing chamber, the bottom of which is shown at $h$, and which preferably has projecting standards $i$ to support the lowermost box off the bottom. The boxes are thus each completely surrounded by an air space, and the carbonizing heat, when the chamber is placed in the furnace, penetrates equally on all sides of each box, and the filaments receive their heat both from the outer and inner walls of the box such heat being readily conducted by the powdered material with which the box is filled, so that all the filaments and all parts of each filament receive the same heat and are all equally carbonized, they being equidistant at all points from the walls of the chamber.

The powdered material keeps the filaments under such stress, so that while their contraction is permitted, they do not become bent or distorted during carbonization.

Heretofore it has been customary to pack the filaments in boxes so constructed that some are close to its bottom and sides and others farther away; and a number of such boxes have been placed one upon another, without any space between them. It will readily be seen that in this way the heat will penetrate much more quickly to some parts of the pile of boxes and to some parts of the contents of each box than to others.

By my arrangement I divide the collection of filaments to be carbonized into a number of separated parts, each part receiving heat equally on all sides, whereby more effective carbonization is secured as has already been explained.

What I claim is—

1. The combination of two or more covered boxes or receptacles for the filaments placed one above another, said receptacles having standards or projections whereby they are separated and an air space is left between them, substantially as set forth.

2. A group of covered receptacles or carbonizing boxes for incandescent lamp filaments, the several boxes being placed one above another and having covers on which are standards or projections which support the boxes above it, substantially as described.

3. A group of covered receptacles or carbonizing boxes for incandescent lamp filaments, each box having outer walls $a$, inner walls $b$, bottom $c$ between the walls, tightly fitting cover $d$, and standards or projections $e$ for separating the boxes when placed one above another, whereby air spaces are left between them, substantially as set forth.

This specification signed and witnessed this 20th day of December, 1886.

THOS. A. EDISON.

Witnesses:
WM. PEZER,
E. C. ROWLAND.